US007028130B2

(12) United States Patent
Lueck et al.

(10) Patent No.: US 7,028,130 B2
(45) Date of Patent: Apr. 11, 2006

(54) GENERATING MULTIPLE TRAFFIC CLASSES ON A PCI EXPRESS FABRIC FROM PCI DEVICES

(75) Inventors: Andrew W. Lueck, Plano, TX (US); Kevin K. Main, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 205 days.

(21) Appl. No.: 10/640,994

(22) Filed: Aug. 14, 2003

(65) Prior Publication Data

US 2005/0038948 A1 Feb. 17, 2005

(51) Int. Cl.
 *G06F 13/36* (2006.01)
(52) U.S. Cl. .............. 710/306; 710/313; 710/314; 710/315; 370/402
(58) Field of Classification Search ........... 710/306, 710/313, 315, 305, 240, 62, 72, 314; 370/402, 370/419, 421, 257, 235, 229; 709/223, 230, 709/238, 235, 253
See application file for complete search history.

(56) References Cited

U.S. PATENT DOCUMENTS 5,822,612 A * 10/1998 Thomas et al. ............... 710/6
5,867,480 A * 2/1999 Thomas et al. ............. 370/230
6,591,299 B1 * 7/2003 Riddle et al. ............... 709/224
6,785,760 B1 * 8/2004 Asselin ....................... 710/315

OTHER PUBLICATIONS

"Multi-ported PCI-to-PCi bridge chip" by Annamalai, K. (abstract only) Publication Date: Nov. 4-6, 1997.*
PCI Express Base Specification, Rev. 1.0, Table 2-23: Ordering Rules Summary Table, pp. 98-99.
PCI Express Base Specification, Rev. 1.0, Virtual Channel (VC) Mechanism, pp. 101-106.
PCI Express Base Specification, Rev. 1.0, Virtual Channel Support, pp. 273-284.

* cited by examiner

*Primary Examiner*—Gopal C. Ray
(74) *Attorney, Agent, or Firm*—William B. Kempler; W. James Brady, III; Frederick J. Telecky, Jr.

(57) ABSTRACT

A system having a PCI Express fabric and PCI devices connected thereto transmits data from the PCI devices having PCI Express traffic classes assigned. A PCI Express to PCI bridge assigns a predetermined address to the grant line for each PCI device coupled to the PCI bus and stores this address along with the data from the PCI device in the PCI transaction queues. When the data is transmitted along the PCI Express fabric, or when it is processed within the PCI Express to PCI bridge, the address assigned to the respective grant line becomes the PCI Express traffic class for that data. This enables the commands from one device to be processed irrespective of commands from other PCI devices on the PCI bus.

3 Claims, 1 Drawing Sheet

GENERATING MULTIPLE TRAFFIC CLASSES ON A PCI EXPRESS FABRIC FROM PCI DEVICES

FIELD OF THE INVENTION

This invention relates to generating multiple traffic classes on a PCI Express fabric (a network of interconnected devices and switches) for data from a PCI device and more specifically to a PCI Express to PCI bridge which generates these traffic classes.

BACKGROUND OF THE INVENTION

Peripheral Component Interconnect (PCI) is a parallel bus architecture developed in 1992 which as become the predominant local bus for personal computers and similar platforms. The implementation of this technology has come close to its practical limits of performance and can not easily be scaled up in frequency or down in voltage. A new architecture utilizing point-to-point transmission, having a higher speed, and which is scalable for future improvements, is known as PCI Express.

In accordance with PCI bus specifications, WRITE commands take precedence over READ commands. This is summarized in Table 2-23: Ordering Rules Summary Table of the PCI Express Base Specification, Rev. 1.0. Thus, if a READ command is held up in a queue because the device to be read is busy, for example, a WRITE command made subsequently will be processed before the READ command. Given the fact that a bridge coupled to a PCI bus does not know which device generated the data, if one PCI device coupled to the bus is actively sending out WRITE commands, it can block the READ commands of another PCI device on the bus, thereby increasing its latency.

PCI Express provides a way to overcome this limitation by providing for traffic classes. The classes consist of 3 bits located in the header of a packet being sent over a PCI Express fabric. READ and WRITE commands for each traffic class are treated independent of these commands for other classes. Section 2.5 of the PCI Express Base Specification, Rev. 1.0 discusses a PCI Express Virtual Channel (VC) mechanism which provides support for carrying throughout the PCI Express fabric traffic that is differentiated using TC (traffic class) labels. In order to provide flexibility in the design of equipment, the PCI Express standard sets up rules for the implementation of traffic classes, but makes support for traffic classes beyond TC0 optional. The standard allows user to decide how the TCs will be utilized.

A PCI Express to PCI bridge will allow PCI devices to be connected to a PCI bus in a PCI Express architecture. FIG. 1 shows a block diagram of a computer system 100 implementing a standard PCI Express to PCI bridge 112. The bridge is coupled by lines 108 to a PCI Express switch 106, which is coupled by lines 104 to CPU 102. The PCI Express switch is also coupled via lines 110 to other devices (not shown). The PCI bus 114 is connected to the bridge and to two PCI applications 116, 120 respectively. Each of the applications has request/grant lines 118 and 122 respectively. Assume that PCI application (device) 120 generates a READ command which is stored in a PCI FIFO queue (not shown) in bridge 112. The device to be read is busy so the command is held to be retried (a common situation). Later, PCI application 116 generates a WRITE command which enters the queue, while the READ command for application 120 is still pending. The bridge will process the WRITE command before the READ command even if the device to be read now becomes available and even if application 120 has been waiting a long time for a response whereas application 116 has just generated its WRITE command. Thus, the latency for application 120 will suffer.

SUMMARY OF THE INVENTION

It is a general object of the present invention to implement the generation of PCI Express traffic classes for data generated by a PCI device.

This and other objects and features are provided, in accordance with one aspect of the invention, by a PCI Express to PCI bridge comprising a PCI bus interface couplable to a PCI bus. A PCI bus arbiter is coupled to the PCI bus interface and has request/grant lines for PCI devices to be connected to the PCI bus. PCI transaction queues are coupled to the PCI bus interface for receiving PCI transactions. A PCI Express interface coupled to the PCI transaction queues and to a PCI Express output port; wherein the PCI bus arbiter assigns a PCI Express traffic class code to data received from a PCI device, the traffic class code being different for each PCI device connected to the PCI bus.

A further aspect of the invention includes method of operating a PCI Express to PCI bridge comprising receiving a request for access to a PCI bus from a PCI device coupled to the PCI bus. Generating a grant to the PCI device for access to the bus. Storing data received from the PCI device in a PCI transaction queue, the data being stored with a PCI Express traffic class corresponding only to that PCI device.

Another aspect of the invention is providedly a method of transmitting data generated by PCI device on a PCI Express fabric.

Data is received from a PCI device. The data is stored with a predetermined PCI Express traffic class code corresponding to the PCI device. The data and the traffic code are transmitted on the PCI Express fabric.

Yet another aspect of the invention comprises a PCI Express to PCI bridge having a connection to a PCI bus and a connection to a PCI Express fabric. Means assigns a predetermined PCI Express traffic code to data from each respective device coupled to the bridge. Means stores the data and the traffic code.

DETAILED DESCRIPTION OF THE PRESENT INVENTION

Figure 1:
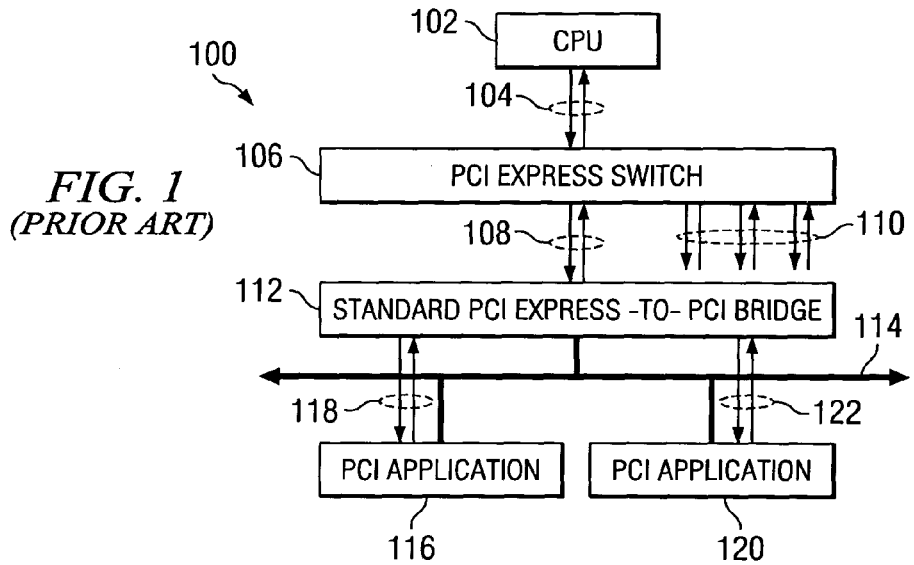
FIG. 1 is a block diagram while a current implementation of a PCI Express to PCI bridge.
Figure 2:
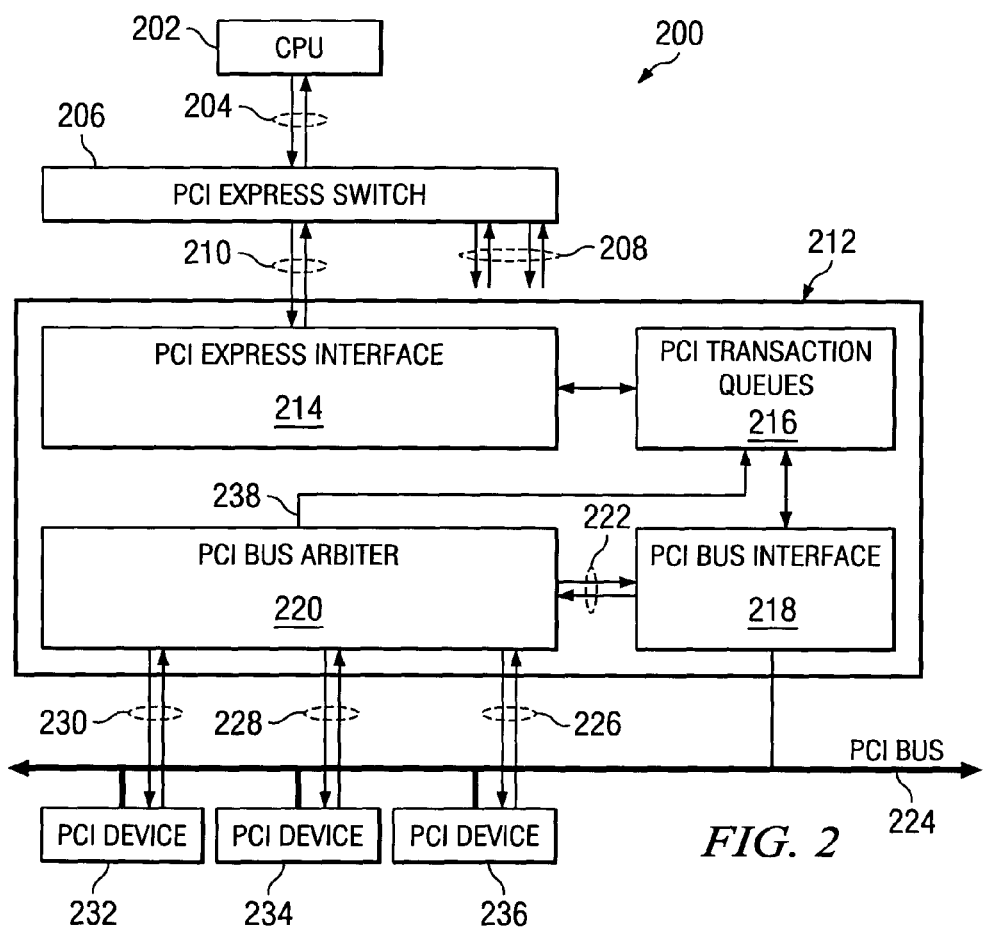
FIG. 2 is a block diagram of a PCI Express to PCI bridge and system according to the present invention.

FIG. 2 is a system 200 and a PCI Express to PCI bridge 212 according to the present invention. The bridge 212 is connected to a PCI Express fabric via lines 210 and to a PCI bus 224. The PCI Express fabric comprises PCI Express switch 206 which is coupled via lines 204 to CPU 202. The switch 206 is also coupled via lines 208 to other PCI Express devices or switches (not shown). Attached to PCI bus 224 are three PCI compliant devices 232, 234 and 236. Each of these devices has a request/grant pair of lines 230, 228, 226 respectively. The request/grant lines are coupled to PCI bus arbiter 220. The PCI bus is coupled to PCI bus interface 218. PCI bus interface 218 is coupled by a two way bus to PCI transaction queues 216. PCI bus interface 218 is also coupled by a request/grant pair 222 to PCI bus arbiter 220. Additional information supplied by the PCI bus arbiter 220 which can be stored with the data in the PCI transaction queues 216, as discussed below, is provided along line 238. The PCI transaction queues 216 are coupled by a two way bus to the PCI Express interface 214 which is coupled to the lines 210.

Each of the grant lines of request/grant line pair 230, 228 and 226, respectively, is associated with an address. A bridge such as 212 may typically allow for up to six PCI devices to be connected to the PCI bus so that a 3 bit address is adequate for this purpose. When one of the PCI devices, such as PCI device 232 sends out a request for access to the bus, the PCI bus arbiter will process this request in accordance with a predetermined protocol. This protocol can be the standard PCI round-robin protocol, or another protocol such as that utilized in copending U.S. application Ser. No. 10/640,988 (TI-35560), commonly assigned, filed on even date with this application and incorporated herein by reference, may be utilized. Once the PCI bus arbiter has asserted the grant on the grant line of request/grant pair 230, for example, the data sent from PCI device 232 to the PCI bus 224 will be associated with the address for this grant line, which may be address 000, for example. This address is communicated along line 238 to the PCI transaction queues 216. The data from the device is received by PCI bus interface 218 and the slave circuit in the interface receives the data and processes the data into the PCI transaction queues. In the PCI transaction queues, the data will be combined with the address of the grant line and this address will become the PCI Express traffic class for that data. When the data is to be transmitted along the PCI Express fabric, the data will be sent from the PCI transaction queues to a standard PCI Express interface 214 on to lines 210 to PCI Express switch 206. From PCI Express switch 206, the data can be sent to CPU 202 or to other devices on the PCI Express fabric (not shown).

If PCI device 232 is sending a READ command along the bus to obtain the status of another device on the PCI Express fabric, which READ command is being held up because the device to be READ is busy, this command is unaffected by WRITE request from either PCI device 234 or 236. This is because commands generated by these devices will be assigned to a different traffic class which will be the address of grant lines 228 and 226, respectively. These addresses might be 001 and 010, for example. Thus, the READ command from PCI device 232 will not suffer from a longer latency because of the activity of the other PCI devices on the bus. Similarly, in the PCI Express switch 206, if there are WRITE commands from the other devices coupled to lines 208, only those having the same traffic class will effect the transmission of the READ command in the PCI Express fabric.

It should be noted that it is not necessary to discuss the flow of data into the PCI Express to PCI bridge 212 from the PCI Express fabric, because the PCI Express fabric already supports traffic classes. The devices needed to build the PCI Express to PCI bridge 212 and the system 200 are well known in the art and need not be described in detail here.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. In a PCI Express to PCI bridge having a connection to a PCI bus and a connection to a PCI Express fabric, the improvement comprising means for assigning a predetermined PCI Express traffic code to data from each respective device coupled to the bridge; and means for storing the data and the traffic code wherein the PCI Express traffic code assigned to data from the PCI device is related to the address of the request/grant lines for that device.

2. The bridge of claim 1 wherein the PCI Express traffic code is 3 bits.

3. The bridge of claim 1 wherein the PCI Express traffic code is stored in a header of a packet transmitted on the PCI Express fabric.

* * * * *